NOEL B. PROCTOR
INVENTOR

BY Arnold, Roylance,
Kruger & Durkee
ATTORNEYS

NOEL B. PROCTOR
INVENTOR

BY Arnold, Roylance,
Kruger & Durkee
ATTORNEYS

NOEL B. PROCTOR
INVENTOR

BY Arnold, Roylance,
Kruger & Durkee
ATTORNEYS

United States Patent Office 3,529,236
Patented Sept. 15, 1970

1

3,529,236
MAGNETIC FLUX SENSORS HAVING CORE STRUCTURE OF GENERALLY CLOSED CONFIGURATION FOR USE IN NONDESTRUCTIVE TESTING
Noel B. Proctor, Houston, Tex., assignor to American Machine & Foundry Company, New York, N.Y., a corporation of New Jersey
Filed Nov. 3, 1967, Ser. No. 680,404
Int. Cl. G01r 33/12; G11b 5/38
U.S. Cl. 324—37                                8 Claims

ABSTRACT OF THE DISCLOSURE

This application discloses magnetic flux detectors in the form of C-shaped or E-shaped magnetic core structures using flux responsive transducers such as Hall effect devices or flux gate magnetometers in the core structures. The magnetic sensing devices are particularly useful in pipeline inspection.

---

One of the preferred techniques for locating flaws or defects in ferromagnetic materials is that of providing magnetic flux in the object being tested and sensing flux leakage or magnetic perturbations near the surface of the object. Flaws in the object will cause magnetic flux to be deflected out, and this leakage flux may be detected by various techniques such as search coils, Hall effect devices, and magnetometers.

The inspection of steel pipeline of the type used for transporting petroleum products and natural gas throughout the country is one of the widespread uses of the flux leakage technique for detecting flaws, These pipelines are subjected to quite high pressures, and so flaws, cracks and pits caused by corrosion, stress, etc., may result in catastrophic failures. For this reason, the pipelines are periodically inspected by passing inspection assemblies through the pipelines, the pipelines usually being buried underground, and recording the results of the magnetic flux leakage inspection for subsequent evaluation to determine if repairs are necessary. The defects of interest may include narrow cracks which result in slight deflection of flux, and so the sensors must be quite sensitive. An inspection assembly or inspection "pig" traveling through a pipeline encounters many obstructions in the form of weld beads, seams, icicles of weld material, bends, flats, valve seats, debris and the like. Thus the inspection apparatus is subjected to frequent collision, bouncing, vibration, etc., while it must be held quite close to the surface of the pipeline wall for optimum response to small defects. These factors result in a great deal of noise being produced in the recorded signals, thus reducing the ability of the system to distinguish small flaws. Usually the pipeline walls will be scanned by a number of flux leakage detectors, and since the decision on whether or not a repair is needed will be based on the magnitude of the detected flaws, the response to a given sized flaw must be known and uniform among the several sensors. The inspection apparatus will encounter considerable variations in temperature in traversing mile after mile of the pipeline under varying weather conditions, and so the temperature response characteristics of the sensor must be in some manner compensated. Preferably the recorded signal produced from a given sized flaw should not be dependent upon the speed of the inspection pig as it passes the flaw, as is true in the search coil type of detector. It is for the purpose of alleviating or avoiding difficulties of the types as have been discussed that the magnetic flux sensing devices of the invention have been developed.

A primary feature of the invention is the provision of

2 flux responsive sensors for use in the nondestructive testing of ferromagnetic materials, particularly in inspection apparatus for pipelines or the like. Some of the principal features of the flux leakage sensors of the invention are the ability of the sensors to discriminate between magnetic disturbances generated by flaws or defects and disturbances generated by noise-producing factors such as magnetic surface domain perturbations and the like. Another feature of considerable interest is the greater sensitivity permitted by these sensors, hence reduction in problems of noise and high gain amplifiers or, in general, the increase in signal-to-noise ratio. Other significant features include the provision of temperature compensation and calibration techniques, as well as the provision of structures responsive to low gradient flux patterns.

The features which are believed characteristic of the invention are set forth in the appended claims. The invention itself, however, as well as other features and advantages thereof, may best be understood by reference to the following detailed description of particular embodiments, when read in conjunction with the accompanying drawings, wherein:

FIG. 10a is a view as in FIG. 10 of the flux sensing device shaped for inspection of the interior surface of a pipeline or the like;

FIG. 10b is an end view as in FIG. 10 of the flux sensing device having pole pieces shaped for exterior inspection of a pipeline or the like;

The various figures of the drawings form a part of this specification, and it will be noted that like parts are designated by the same reference numerals when appearing in several views of the drawings.

Figures 1, 1A, 2, 3:
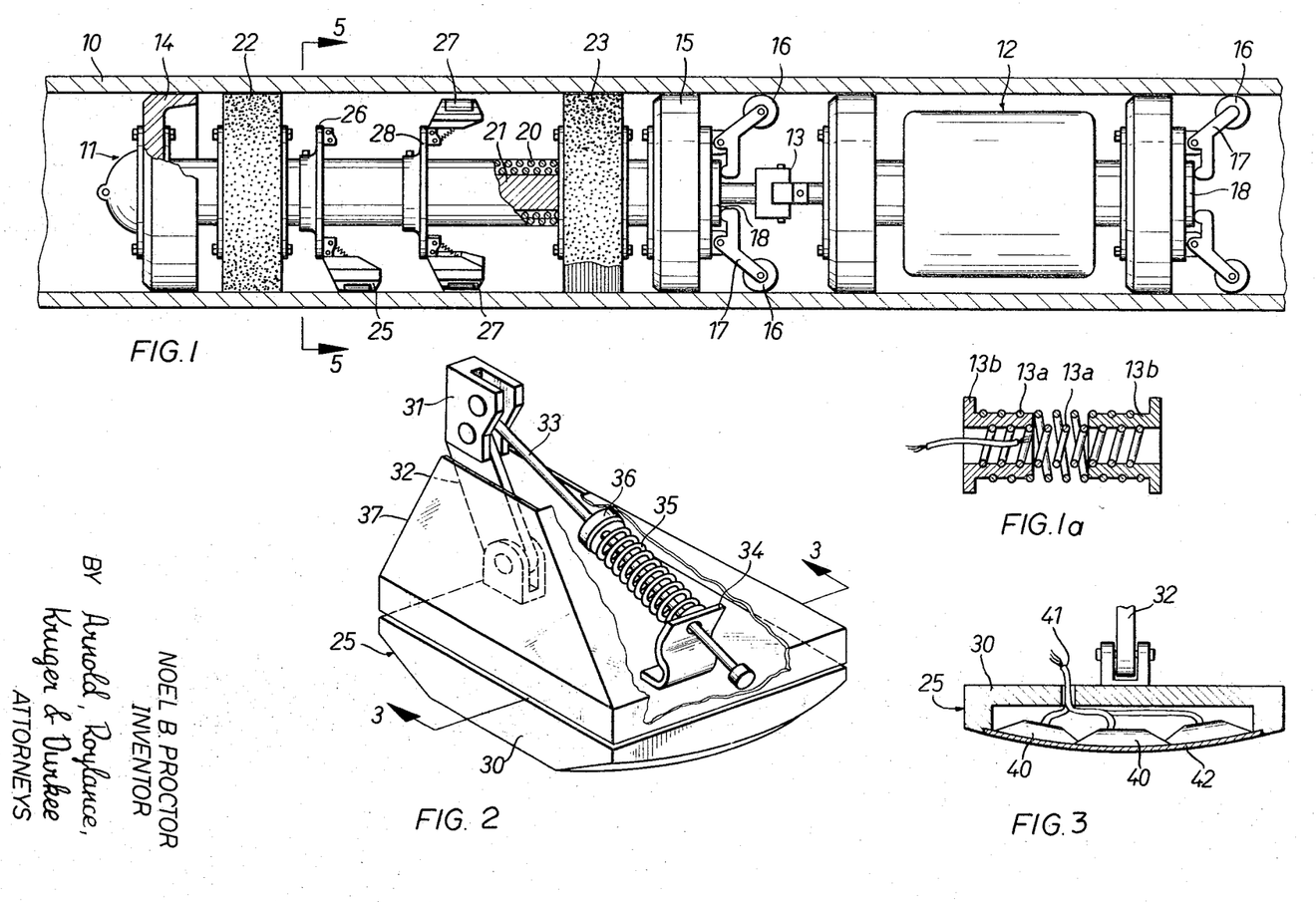
FIG. 1 is an elevation view, partly in section and partly broken away, of pipeline inspection apparatus of the type employing flux detectors according to the invention.
FIG. 1a is a detail view in section of a preferred type of coupling used in the pipeline inspection apparatus of FIG. 1.
FIG. 2 is a pictorial view of one of the detector assemblies in the apparatus of FIG. 1.
FIG. 3 is an elevation view in section of the apparatus of FIG. 2, taken along the line 3—3 in FIG. 2.

With reference to FIG. 1 of the drawings, nondestructive testing apparatus of the type using the magnetic flux detectors or sensors of this invention is illustrated in the form of a pipeline inspection pig. In this inspection apparatus, magnetic flux is generated in the wall of a pipeline 10 as the pig travels along the pipeline under propulsion of the product being transported. Flux detectors scan the interior circumference of the pipeline to sense flux deflected out of the pipe wall by flaws, pits, cracks and the like which represent possibly hazardous defects in the transmission line. The results of the scanning are recorded for subsequent examination, since an inspection run may be up to perhaps fifty miles or the distance between pumping stations along the line. The conditions under which the inspection pig must detect and record slight anomalies in magnetic fields necessitate the use of flux detectors which are simple, rugged and reliable yet quite sensitive and accurate without producing excess electrical noise. Although the flux sensors of this invention are useful for many purposes, the pipeline inspection pig is one environment in which the features of the invention are particularly useful. For this reason, the inspection pig of FIG. 1 will be considered in some detail.

The pipeline inspection apparatus of FIG. 1 includes a first section which functions as the driver or propelling unit to drag the assembly through the pipeline under propulsion of the product being transported, and the front section also includes the magnetizer and detector assemblies. A rear or trailing section 12 contains the power supply, electronic instrumentation, and a magnetic tape recorder. The front and rear sections 11 and 12 are coupled together by a universal joint 13 which permits the assembly to flex as bends and discontinuities in the pipeline are encountered.

Since it is important that the assembly pass freely through the pipeline around bends and twists that may be encountered, it is necessary that the assembly be non-rigid or flexible along its length. The entire assembly may be ten or fifteen feet long in a large diameter pipeline and so cannot be rigid over this entire distance. Universal joints or ball joints are subject to breakage if bent more than a critical angle, and also transfer mechanical shock and vibration from one part of the assembly to the other. Also, if the electrical cables are to be protected, the preferred location is in a central bore; however, the cables are subject to abrasion or severing if threaded through a U-joint. For these reasons, a coupling as shown in FIG. 1a may be utilized, this coupling comprising a pair of large spring or spiral members 13a wound in opposite directions, one left-handed and one right-handed. These springs are threaded onto or fitted over grooves in opposing members 13b which are mechanically connected to the rear of the front section 11 and the front of the rear section 12, respectively. The electrical cables connecting the front and rear sections may be threaded through this arrangement with no exposure to damage. The opposing thread directions of the two members 13a prevent excessive torsional movements of the sections. The ends of the springs 13a may be welded or brazed to the members 13b. While this coupling is preferred in inspection pigs of this type, it is not critical to the flux detectors of the invention.

The front section of the inspection pig includes front and rear rubber packers 14 and 15 which include cup-shaped annular rubber members functioning to trap fluid behind the assembly to propel the pig. A centralizer assembly may be used with both the front and rear sections to prevent the pig from tending to settle toward the bottom of the line under its own weight, the centralizer including wheels 16 mounted on pivoted arms 17, with the arms being urged outwardly by a spring-biased drum 18. Magnetic flux is generated in the walls of the pipeline parallel to the axis of the line by a large magnetizer coil 20 surrounding a central cylindrical magnetic core 21. Pole pieces for the core 21 comprise circular steel brushes 22 and 23 which frictionally engage the pipe walls around the circumference of the interior and couple magnetic flux from one end of the core 21 through the pipe wall and back into the other end of the core. The coil 20 is continuously energized by direct current supplied from a bank of batteries in the trailing assembly 12. In this manner a high level of magnetic flux can be produced in the pipe wall, with the flux evenly distributed around the circumference. Discontinuities in the pipe wall such as cracks, flaws or corrosion pits will cause deflection of the flux out of the wall, and this leakage flux may be detected adjacent the interior surface of the wall to provide an indication of defects.

An array of twelve detector shoe assemblies is used in the embodiment of FIG. 1 to scan the interior of the pipe wall in the space between the pole pieces or brushes 22 and 23. A set of six detector shoes 25 is mounted on a front disk-shaped mounting bracket 26, while a second set of detector shoes 27 is mounted behind the first set on a mounting plate 28. The set of detector shoes 27 is offset with respect to the detector shoes 25 by 30°, with each detector shoe scanning at least 30° of arc, so that the entire 360° circumference of the pipeline is scanned.

Referring to FIG. 2, one of the detector shoe assemblies 25 is shown in perspective, it being understood that the remainder of the assemblies 25 as well as the detector shoe assemblies 27 are all similar in construction. The assembly 25 includes a detector shoe 30 which is shaped on its bottom face generally along the contour of the interior of the pipeline wall, with the shoe being secured to a mounting bracket 31 on the plate 26 by a pivoted arm 32. The shoe 30 is held in engagement with the pipeline wall by a spring arrangement including a rod 33 pivotally attached to the bracket 31 and slidably engaging a bracket 34 at the rear of the shoe. A compressed spring 35 bearing against the bracket 34 and a flange 36 on the rod 33 provide the mechanism for urging the shoe outwardly against the pipe wall. A fairing or shroud 37 protects the shoe assembly mounting mechanism from damage due to collisions with debris and obstructions.

Figure 4:
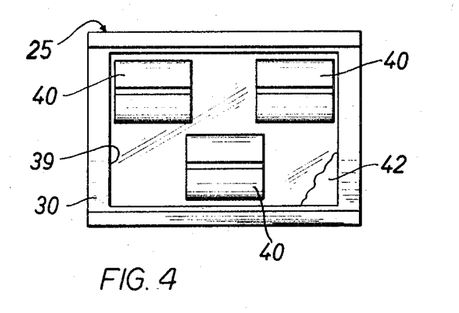
FIG. 4 is a bottom view of the detector assembly of FIGS. 2 and 3.
Figure 5:
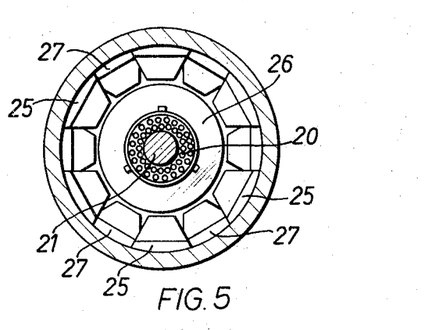
FIG. 5 is a cross-sectional view of the apparatus of FIG. 1, taken along the line 5—5 in FIG. 1.

The detector shoe 30 in each of the detector assemblies 25 or 27 includes a recess in the lower face thereof as will be seen in the sectional view of FIG. 3, the recess being for the purpose of housing one or more flux detectors 40, each of which scans a segment of the pipe wall. The flux detectors are individually connected to electronic instrumentation and recording circuitry in the trailing section 12 by a cable 41 which is bunched with cables from all twelve detector assemblies and fed back to the trailing section. The positions of the flux detectors 40 within the recess 39 may be seen in FIG. 4 which is a bottom view of the detector shoe 30. The flux detectors 40 are protected by, and may be mounted on, a thin shim 42 which is composed of a nonmagnetic material such as stainless steel, shown broken away in FIG. 4. Since the array of flux detectors 40 in each detector shoe 30 scans less than the entire width of the shoe due to wall thickness, etc., the shoes 30 are actually wider than 30° of arc, and so the shoe assemblies 25 and 27 overlap somewhat as seen in the sectional end view of FIG. 5, assuring complete scan of the entire circumference.

The pipeline inspection apparatus which has been described with reference to FIGS. 1–5 is of the same type disclosed and claimed in copending application Ser. No. 680,573, filed herewith and assigned to the assignee of the present invention. This construction of inspection apparatus is quite advantageous in that evenly distributed magnetic flux is provided around the circumference with little leakage from the wire brush pole pieces, and positioning of the detector assemblies between the pole pieces for full 360° scan provides inspection capability not heretofore available.

In the flux leakage type pipeline inspection apparatus of FIGS. 1–5, or in more conventional structures using different types of magnetizers or scanning assemblies, the conventional flux detector element is a flat conductive coil positioned to intercept lines of flux deflected out of the pipe wall so that any change of flux as may occur due to anomalies in the pipe wall results in a change of flux in the coil and generation of current in the coil. While this flux leakage detector arrangement has been widely used, it will be noted that the magnitude of current generated in the detector coil by a given size anomaly or flaw will be dependent upon the speed of movement of the inspection pig through the pipeline. A high level of noise is inherent in the flux leakage scanning technique due to the fact that magnetic flux does exist adjacent the pipe wall even in areas where no flaws exist, this leakage flux exhibits a gradient dependent upon the radial distance from the pipe wall, and leakage flux is generated in the vicinity of the magnetizing core and pole pieces such as the brushes 22 and 23 needed to couple the flux into the pipe wall. This stray flux inherently results in generation of noise by flux leakage detector coils, a condition which is worsened by the fact that the detector shoes cannot ride smoothly on the pipe walls. Weld seams exist at every joint between sections of pipeline, and "icicles" of weld metal may protrude into the line, these causing rather violent deflection and bouncing of the detector shoe assemblies. Likewise debris, bends, flats and a variety of other discontinuities or obstructions will cause vibration and bouncing of the detector shoes. The unavoidable result of these factors is a high levels of background noise in the output of flux leakage detector coils, reducing the resolution and reliability of recordings or logs produced by the inspection apparatus.

Figure 6:
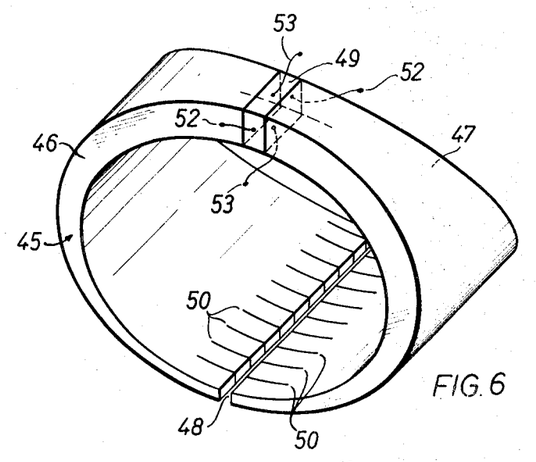
FIG. 6 is a pictorial view of a flux detector device according to one embodiment of the invention.

According to the invention, an improved form of flux sensor or detector as will be described with reference to FIG. 6 may advantageously be used in the pipeline inspection apparatus of FIGS. 1–5. In the embodiment of FIG. 6 the flux sensor comprises a generally C-shaped core structure 45 including first and second pole pieces 46 and 47 defining a narrow elongated air gap 48 at the lower face thereof and employing a magnetic flux responsive device such as a Hall effect element 49. The pole pieces 46 and 47 are constructed in a manner such that the pole tips adjacent the air gap 48 are flared out to a width dimension several times that in the region adjacent the Hall element 49, but the pole tips are much thinner than the thickness at the upper side next to the Hall element. That is, the pole tips are very wide but quite thin or shallow, while the pole pieces 46 and 47 are generally square in cross-section in the vicinity of the Hall element 49. The pole tips are slotted by a pattern of regularly spaced narrow slits 50 filled with insulating material for purposes as will be described.

Figure 7:
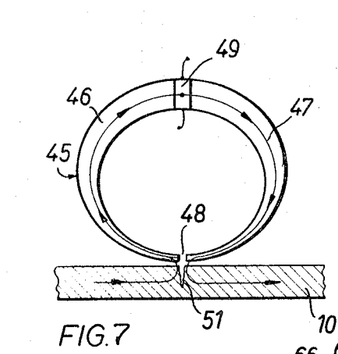
FIG. 7 is an elevation view in schematic form of the device of FIG. 6 in operation.

Referring to FIG. 7, the operation of the core structure 45 in the vicinity of a defect 51 in the pipe wall 10 may be observed. With the pipe wall 10 magnetized, the high reluctance exhibited by the defect 51 will cause stray fields to emerge from the wall and extend inward around the site of the defect. When the magnetic core structure 45 for the sensor is not present near the defect, the emerging field sees a higher reluctance than when the high permeability material of the core structure 45 is in the position indicated in FIG. 7. The reluctance through the pole pieces 46 and 47 and the sensing element 49 is much lower than exhibited by the air path adjacent the defect in the absence of the core structure 45. Thus, the preferred path is as indicated by the flux lines of FIG. 7, i.e., through the flux responsive element 49. Because of the much lower reluctance of the high permeability material in the structure 45, the leakage around a defect will increase markedly as the detector moves across the defect, thereby improving resolution or "detectability" and improving signal-to-noise ratio. It should be noted that magnetic noise, surface noise and the like in ferromagnetic material is caused by small surface dislocations and unterminated magnetic domains, and these do not experience the same increase in leakage fields in the presence of the sensor structure as does the defect. It is for these reasons that the sensor structure of the invention exhibits an improved signal-to-noise ratio in comparison to conventional search coil techniques which provide no factor of augmenting the leakage field. A typical defect encountered in a pipe wall may cause a field disturbance of perhaps one to fifty gauss in the area adjacent the site of the defect, whereas the leakage around the defect with the sensor structure 45 in place may be increased to values of perhaps 100 to 5000 gauss, i.e. by a factor of one hundred, two orders of magnitude. The improvement in flaw detection capability provided by leakage enhancement of this magnitude is readily apparent.

The shaping of the magnetic structure in the embodiment of FIG. 6 provides several noteworthy features. The pole tips adjacent the air gap 48 are made quite wide and thin so that a wide arc may be scanned with one sensor. The cross-sectional area of the pole tip at gap 48 may be made no greater than, and preferably much less than, the cross-sectional area at the pole ends adjacent Hall element 49. It has been found that a ratio of about 8 to 1 for sensing element cross-section to pole element cross-section is perhaps optimum.

The pole tips adjacent the air gap 48 are slotted for two reasons, the first being the reduction of eddy currents in the pole tips near the gaps. Without the slits 50, eddy currents could occur in the pole tips which would generate magnetic fields of on the order of one-tenth as great as the interrogated field, thus adding to the noise of the system. The fact that the pole tips are quite thin or shallow adjacent the gap also aids in reducing eddy currents. The second reason for providing the slits 50 in the pole tips is to cause a collimating effect on the magnetic field from the leakage configuration. When the leakage field is asymmetrical in the plane of the surface, the collimating effect will result in less tendency for the pole pieces to warp this field.

The flux responsive element, illustrated as a Hall effect device 49 in FIGS. 6 and 7 although other devices such as magnetometers may be used as will be described, is preferably quite thin so that the reluctance introduced by the sensing element is low. The sensing element need not occupy the entire cross-sectional area but instead the pole pieces 46 and 47 may be joined together with the sensing element inserted in a small transverse slot. The Hall element 49 would be of conventional form and include a thin wafer of semiconductor material having contacts on four opposing faces. An AC signal would be applied to conductors 52 connected to a pair of opposing faces while the output signal would be derived from conductors 53 connected to the remaining opposing faces of the Hall device. Output current will be produced from the conductors 53 which is proportional to the magnetic field passing through the element in a direction perpendicular to the flat faces.

Figure 8:
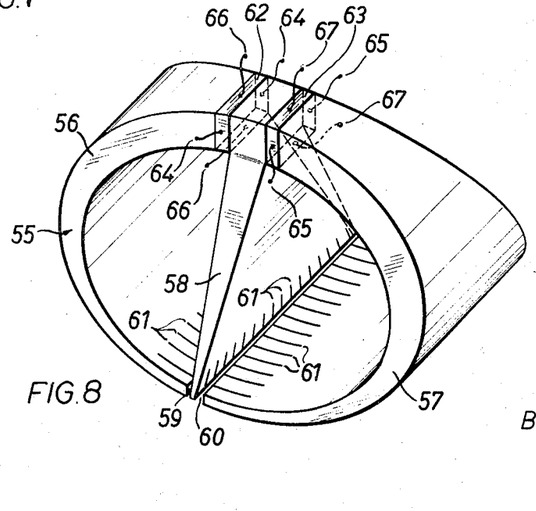
FIG. 8 is a pictorial view of another embodiment of a flux detector device according to the invention.

Another embodiment of the invention is depicted in FIG. 8 which illustrates a magnetic structure 55 having a pair of generally C-shaped pole pieces 56 and 57 similar to those in FIG. 6, but also including a central pole piece which provides an E-shaped or epsilon-shaped magnetic structure. Two air gaps are provided, an air gap 59 between the pole tips for the pole pieces 56 and 58 and an air gap 60 between the tips of the pole pieces 57 and 58. The pole tips contain slits 61 as before, these being filled with insulating material so that eddy currents are avoided and the collimating effect is provided. The FIG. 8 embodiment includes a pair of flux sensing elements in the form of Hall effect devices 62 and 63, these devices being positioned respectively between the pole pieces 56 and 58 and the pole pieces 57 and 58. Each of the Hall elements 62 and 63 includes a pair of input connectors 64 and 65, respectively, and a pair of output connectors 66 and 67, respectively. The output produced by these Hall effect devices as well as the circuitry for driving the devices and detecting the outputs thereof will be described below.

Figure 9:
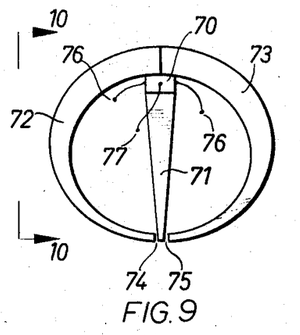
FIG. 9 is an elevation view of flux detector apparatus according to an embodiment of the invention similar to FIG. 8.
Figure 10:
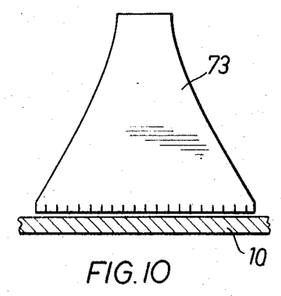
FIG. 10 is an end view of the device of FIG. 9.
Figure 10A:
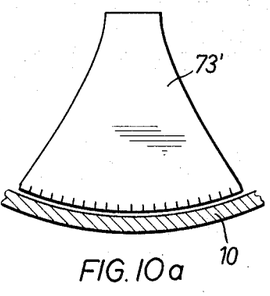
Figure 10B:
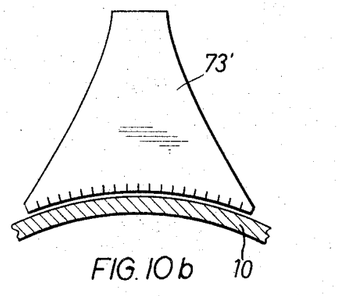

Turning now to FIGS. 9 and 10 of the drawings, an embodiment of the invention is illustrated which is similar to the device of FIG. 8 but includes only one Hall effect device rather than two. In the FIG. 9 embodiment a Hall effect device 70 is utilized which is positioned between the upper part of a central pole piece 71 and the juncture of two C-shaped pole pieces 72 and 73. A pair of air gaps 74 and 75 are provided as in FIG. 8, with the pole tips adjacent the air gaps being slotted as before. The pole pieces are much wider at the pole tips than at the top part adjacent the Hall device 70, as may be readily seen from the end view of FIG. 10. It may be noted in this regard that the outer faces of the pole pieces may be shaped in a convex manner as seen in FIG. 10a to conform to the shape of the interior surface of the pipeline 10. In like manner, for inspection of the exterior walls of the pipeline, as would be done prior to installation of the line, the pole pieces may be shaped in a concave manner as seen in the end view of FIG. 10b, it being understood that similar shaping of the pole pieces is applicable to the embodiments of FIGS. 6 or 8.

In the magnetic structure of FIGS. 9 and 10, it will be noted that no net flux flows in the center pole piece 71 when do differential in flux or flux gradient exists between the air gaps 74 and 75. The Hall effect device 70, responsive only to flux in the center leg, includes input or bias connectors 76, as well as output connectors 77 engaging opposing faces.

The operation of the magnetic structure of FIG. 8 employing two Hall devices, and the magnetic structure of FIG. 9 employing only one Hall device, will now be examined with reference to FIGS. 11 and 12.

Figure 11A:
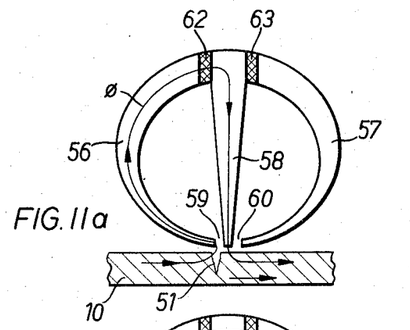
FIGS. 11a–11d are schematic representations of the flux detector structure of FIG. 8 illustrating the operation thereof.
Figure 11B:
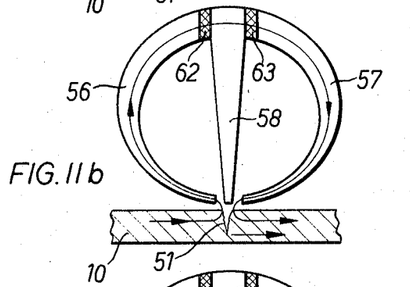
Figure 11C:
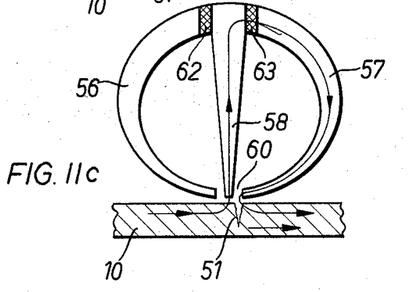
Figures 11D, 12D:
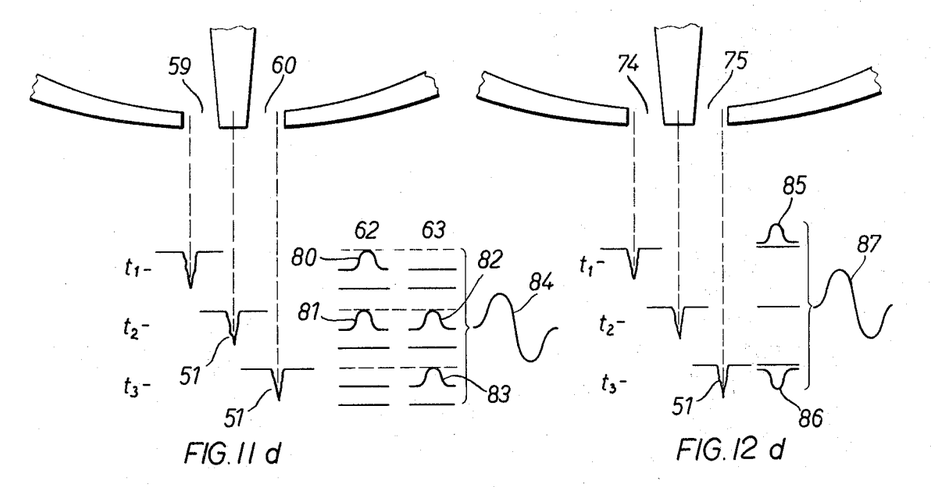
FIGS. 12a–12d are schematic views of the flux detector structure of FIG. 9 illustrating the operation thereof.

Referring to FIG. 11a, the flux sensor of FIG. 8 is shown in position adjacent the pipewall 10 at a time $t_1$ when a flaw 51 is positioned just below the air gap 59. In this condition the leakage flux, taking the path of least reluctance, will flow through the pole piece 56 and the center pole piece 58, little or no flux passing through the pole piece 57, so that only the Hall device 62 produces an output, no output current being produced by the Hall device 63. Now when the flaw 51 has moved to a central position as seen in FIG. 11b the primary path for leakage flux will be through the entire loop of the pole pieces 56 and 57, no net flux flowing through the center pole piece 58, so that both of the Hall devices 62 and 63 will produce essentially the same output current. Then, when the flaw 51 is in a position below the air gap 60 as seen in FIG. 11c the primary path for leakage flux will be through the center pole piece 58 and the righthand pole piece 57, the Hall device 63 producing an output signal but not the Hall device 63, this being designated at time $t_3$. In FIG. 11d this sequence is summarized with the positions of the flaw 51 at times $t_1$, $t_2$, and $t_3$ with respect to the air gaps 59 and 60 correlated with the output signals produced by the Hall devices 62 and 63. At $t_1$ with the flaw 51 below the air gap 59 the Hall device 62 produces a pulse 80 of output current while the Hall device 63 produces no signal. At $t_2$ with the flaw in a central location the Hall devices 62 and 63 both produce output pulses 81 and 82 respectively, and then at time $t_3$ with the flaw below the air gap 60 the Hall device 63 produces an output pulse 83 while the device 62 produces no output. The outputs of the devices 62 and 63 are usually connected in opposition or subtracted, and so the resultant will be a bidirectional impulse 84 as indicated.

Figure 12A:
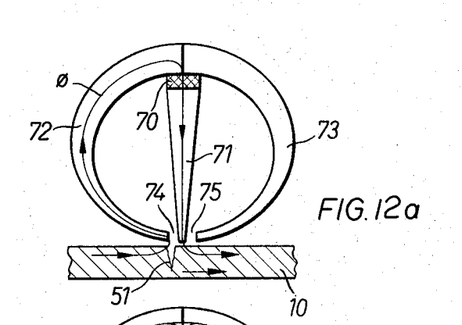
Figure 12B:
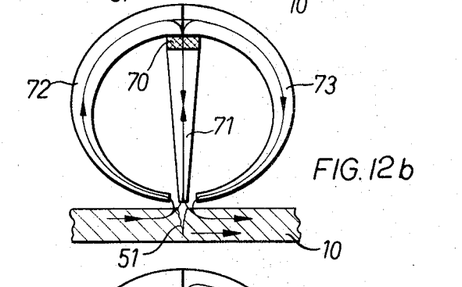
Figure 12C:
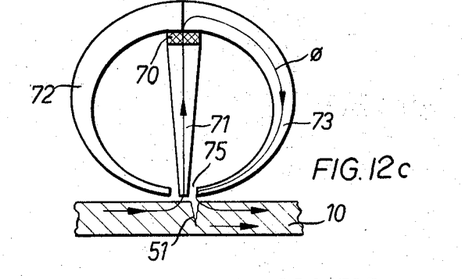

In FIGS. 12a–12d similar relationships are depicted for the device of FIG. 9 using only one Hall effect element. At time $t_1$ with the flaw 51 below the air gap 74 an impulse 85 is produced by the Hall element 70, but when the flaw 51 is in a central position at $t_2$ as in FIG. 12b, there is no output from the Hall element. This is because the next flux through the center leg 71 is zero, the path of least reluctance for the leakage flux being through the outer pole pieces 72 and 73. At the time $t_3$ as indicated in FIG. 12c with the flaw 51 below the air gap 75, the path for leakage flux is through the center leg 71 and the right-hand pole piece 73, flux through the Hall device 70 producing an output pulse 86 as seen in FIG. 12d. The output signals from the Hall device 70 will result in a bidirectional impulse 87 as seen in FIG. 12d, no adding, subtracting or combining necessary.

Figure 13:
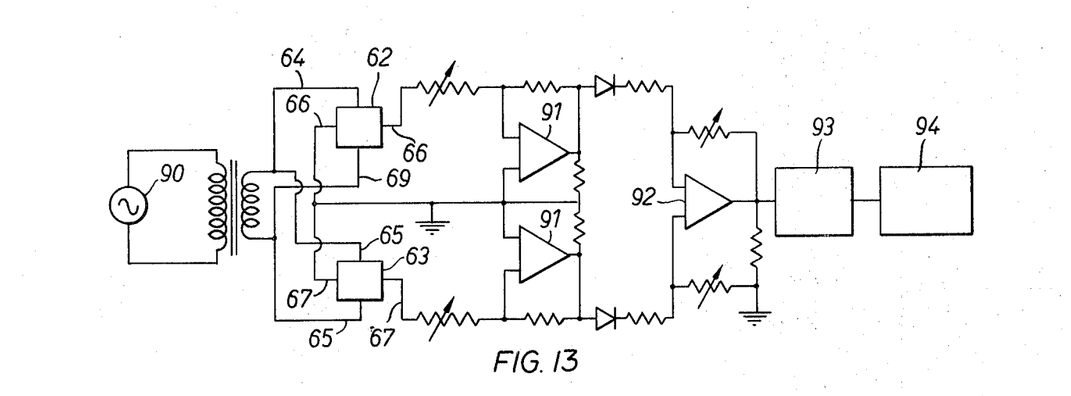
FIG. 13 is an electrical diagram in schematic form of circuitry for use with the detector structure of FIG. 8.

With reference to FIG. 13, electronic circuitry for energizing the Hall effect devices 62 and 63 in the structure of FIG. 8 and deriving output signals from these devices is illustrated. A constant current AC source 90 having a frequency usually in the high audio range is coupled through a transformer to the input terminals 64 for the unit 62 and the input terminals 65 for the unit 63, the inputs to the two units thus being in parallel. One side of each of the outputs 66 or 67 is grounded while the other output terminals are connected to inputs to AC differential amplifiers 91 of conventional form, the negative excursions of the outputs of each of these amplifiers being clipped by diodes and the remaining positive-going portions applied to differential inputs of an amplifier 92. The AC output of this amplifier is applied to a frequency discriminator 93 to produce the composite output pulse such as the pulse 84 of FIG. 11d, it being this signal which is applied to a recorder 94 as would be carried by the pipeline inspection apparatus of FIG. 1.

Figure 14:
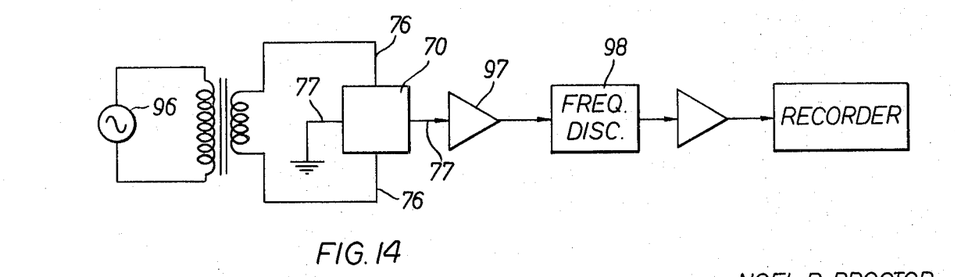
FIG. 14 is an electrical diagram in schematic form of circuitry for use with the flux detector devices of FIGS. 6 or 9.

In FIG. 14, circuitry for deriving output signals from the single Hall effect device of the embodiment of FIG. 9 is illustrated. An AC source 96 applies input signals through a transformer to the input terminal 76, while the output from the conductor 77 is applied through an amplifier 97 to a frequency discriminator 98, the output of which is applied through a DC amplifier to a recorder. The magnetic structure of FIG. 9 using only one flux responsive sensor has certain advantages over the embodiment of FIG. 8 using two flux responsive devices due to the reduction in circuitry required. An improved signal-to-noise ratio results because of the elimination of one channel, and of course the simpler system required for read-out is itself an advantage.

Figure 15:
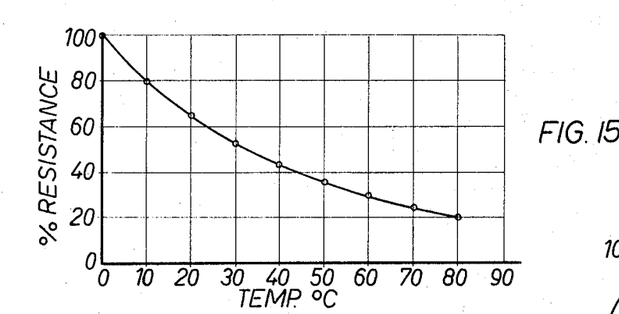
FIG. 15 is a graphic illustration of the resistance of one of the Hall elements used in the flux detector according to the invention, plotted as a function of temperature.
Figure 16:
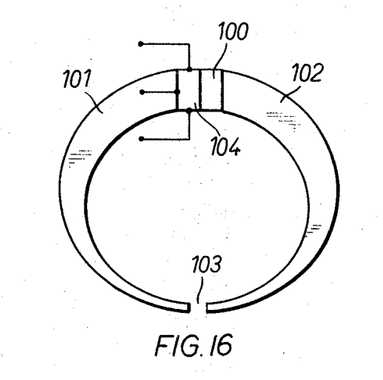
FIG. 16 is an elevation view of a flux sensor structure according to another embodiment of the invention using a temperature compensating shunt.
Figure 17:
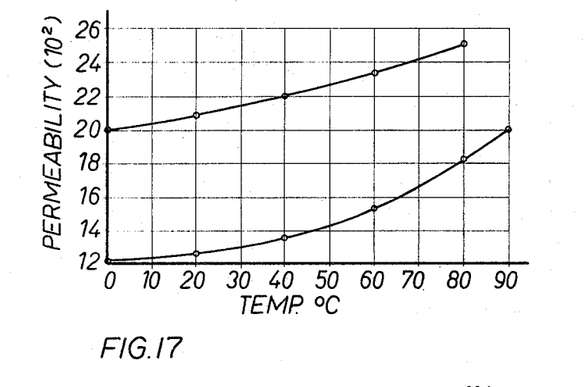
FIG. 17 is a graphic representation of the permeability as a function of temperature for the temperature compensation shunt used in the embodiment of FIG. 16.

Hall effect devices are composed of semiconductor material of a fairly low impurity concentration, and so the resistance of the Hall element will be quite markedly dependent upon temperature. Referring to FIG. 15, a graph of the resistance of a typical Hall effect device as a function of temperature is illustrated, resistance being plotted as a percentage of the resistance at 0° C. Since fairly wide temperature variations may be encountered in pipeline inspection runs, the temperature dependence of Hall effect elements is an undesirable characteristic, restricting the utility of such elements in flux leakage detection in this environment. However, referring to FIG. 16, a compensating plug 100 composed of a material having an inverse temperature characteristic reduces the effect of temperature on a flux sensing structure according to the invention. The structure of FIG. 16 includes pole pieces 101 and 102 defining an air gap 103, with a Hall effect element 104 being interposed. This structure is exactly like that of FIG. 6 except for the compensating plug 100, this plug being composed of a material which has a permeability versus temperature characteristic as seen in FIG. 17. Various magnetic materials having characteristics of this type are commercially available. The arrangement of FIG. 16, with appropriate selection of characteristic curves and sizes of the elements 100 and 104, results in two response curves which are complementary or in opposition to one another as a function of temperature so that the output of the Hall element is virtually constant with changes in temperature. As the temperature increases, the permeability of the element 100, and thus the overall magnetic structure, goes up so that greater flux density exists in the Hall element. Greater flux density in the Hall device counteracts the lower resistance of the device produced by the increased temperature. Without the compensating element 100, a drift in the output due to temperature could cause vast changes in sensitivity, and small fluctuations in temperature could give false indications of flaws. However, with the arrangement of FIGS. 15–17 this difficulty is virtually eliminated. The compensating plug 100 may be inserted in series with the Hall elements 62 and 63 of FIG. 8 or the Hall element 70 of FIG. 9 to provide the same improved results.

Figures 18, 19:
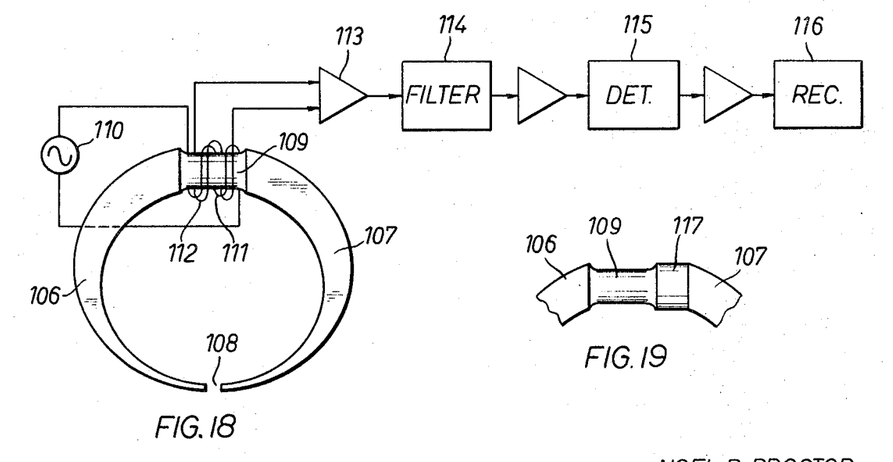
FIG. 18 is a schematic representation of a flux sensor device according to another embodiment of the invention, a flux gate magnetometer being used as the flux sensor element.
FIG. 19 is a fragmentary view of the apparatus of FIG. 18 according to an embodiment of the invention employing a temperature compensating shunt.
Figures 19A, 19B, 20, 21, 22:
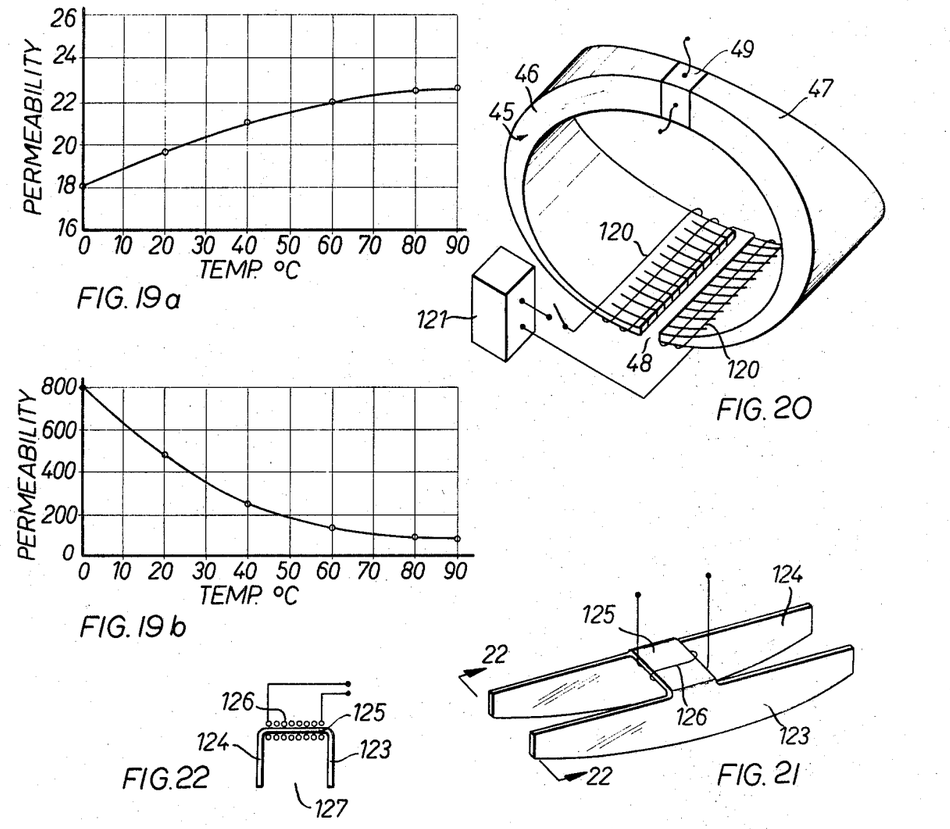
FIGS. 19a and 19b are graphic representations of permeability versus temperature for materials used in the embodiment of FIG. 19.
FIG. 20 is a pictorial view of a flux sensing device according to the invention utilizing calibration windings according to another feature of the invention.
FIG. 21 is a pictorial view of a flux sensor device according to another embodiment.
FIG. 22 is an end view of the device of FIG. 21.

In place of the Hall effect element which has been referred to thus far as the flux responsive device used in the flux sensing structure of the invention, another element suitable for this purpose is the so-called "flux gate magnetometer" as will now be described with reference to FIG. 18. The magnetic structure in the device of FIG. 18 is similar in all respects to that of FIG. 6, except that the sensing element is a flux gate magnetometer rather than a Hall effect device. A pair of pole pieces 106 and 107, shaped as in FIG. 6, define an air gap 108. A ferromagnetic core 109 interposed between the ends of the pole pieces 106 and 107 is excited by alternating current from a source 110 driving a winding 111. A sensing winding 112 surrounds the core 109 and produces an output which is harmonically related to the excitation current and which has a magnitude functionally related to the flux in the core. The output winding 112 is connected through an amplifier 113 and a filter 114, tuned to perhaps a third harmonic of the excitation signal produced by the source 110, with the output of the filter being amplifier and applied to a demodulator 115. This demodulator may be merely a detector to convert the AC amplitude modulated signal to a DC or unidirectional voltage, and this detected output is applied to a recorder 116. The flux gate magnetometer has a dynamic range of perhaps three times that of typical uncorrected Hall effect devices, and the magnetometer is not nearly as temperature dependent as the Hall device. If an almost precisely flat temperature characteristic is desired, then a compensating arrangement as depicted in FIG. 19 may be utilized. This arrangement corresponds to that of FIG. 16 and utilizes a magnetic compensator 117 interposed in series with the pole pieces 106 and 107 and the flux sensing core 109. Typical core materials used in flux gate magnetometers would have magnetization versus temperature characteristics as seen in FIG. 19a, wherein it is seen that as temperature increases the flux density will increase, other factors being equal. This results in an increase in the output signal of the magnetometer. The compensator 117 is composed of a material having a negative slope in its permeability versus temperature characteristic as seen in FIG. 19b. By proper selection of the size of the compensator 117 relative to the core 109, in view of the characteristics as in FIGS. 19a and 19b, a flux sensitive element which is very nearly independent of temperature is provided.

When using flux responsive sensors for the interrogation of the surface and near-surface magnetic fields of ferromagnetic objects such as pipeline in the field, the problem of calibration and standardization is quite complex. Ideally, calibration workpieces having defects with calibrated and well-known parameters would be provided. For example, the standard defects would have a known volumetric displacement and known magnetization in and around the defect. In practice it is virtually impossible to provide standards for calibrations in such manner. The metallurgy around a manufactured defect changes with age, and the magnetic field is a function of temperature, surface contaminations, and magnetization level as well as geometry. These factors have made the standardization of the arrays of detectors used in pipeline inspection apparatus quite complex. Interpretation of the information recorded from the detectors is quite dependent upon magnitudes of detected signals as well as waveforms, the size or depth of a detected flaw being the factor upon which a decision of whether or not to replace a section of pipeline is made, repair or replacement being an extremely expensive procedure.

To alleviate some of the difficulty in calibration, a technique may be utilized as will be described with reference to FIG. 20. A magnetic structure 45 is depicted which is similar in all respects to that of FIG. 6, including pole pieces 46 and 47 defining an air gap 48 and including a Hall effect element 49. Surrounding the pole tips, however, is a coil 120 of a few turns, up to ten perhaps, with the coil being excited upon command by a calibrated and known current source 121. While the current source 121 turned on, current to the coil 120 around the known magnetic loop provided by the magnetic structure 45 produces a known magnetic field across the air gap 48. The output from the sensor element 49 under these conditions may thus be related to the field in the vicinity of the air gap 48 required to produce this output and so the circuitry used in processing the signal output from the element 49 adjusted to "normalize" the system. All of the sensor elements in all of the detector assemblies in the array of FIGS. 1–5 may thus be adjusted to produce the same recorded signal for the same detected magnetic flux leakage. The calibration arrangement of FIG. 20 may be used with the magnetic structures in the embodiments of FIGS. 8, 9, 18, etc., although illustrated as used on the FIG. 6 embodiment.

The flux leakage detectors according to the invention as thus far described are particularly sensitive in detecting small flaws and cracks which produce narrow flux leakage configurations, i.e., high magnetic flux gradients. The very narrow air gaps shown in the embodiments described above are responsive to flux gradients only closely adjacent the air gap, gradients occurring adjacent the magnetic structure but spaced from the air gap being shunted by the magnetic structure and thus not detected. For this reason this device as disclosed does not exhibit a high sensitivity to a class of defects broadly referred to as "pits." Pits are large surface discontinuities with more gently sloping sides as contrasted with cracks or fissures which have sides or surfaces nearly normal to the surface of the pipewall. Pits exhibit magnetic gradients which are perhaps ten times smaller than the gradients associated with cracks. For this reason, detector structures are also provided wherein the pole tips are separated to the maximum extent practical to maintain a reasonable level of sensitivity without unduly increasing the complexity of the detection electronics, it being necessary to increase the gain of the detection circuitry wherein sensitivity is decreased. Another embodiment of the invention which will be described with reference to FIGS. 21–23 provides improved sensitivity to low gradient flux configurations while utilizing a relatively simple circuit arrangement.

With reference to FIG. 21, a magnetic structure is shown which is constructed from a thin sheet of high permeability material to form wide thin pole pieces 123 and 124, bridged by a small bar 125 around which is wrapped an excitation winding 126. Each of the pole pieces 123 and 124 is shaped in the form of a segment of a circle of radius slightly less than the radius of the surface being inspected for inside scanning of a tube which is a pipeline, or of slightly greater radius than the surface being inspected for outside scanning of pipeline or the like. Eddy currents at the pole tips, which correspond to false signals or excessive noise, are minimized due to the fact that the material for the pole is quite thin, material of from two to fourteen mils thickness having been utilized. To reduce the power requirements, it is preferable to use very thin material for the pole pieces, the power increasing directly with volume for thicknesses of this nature.

Figure 23:
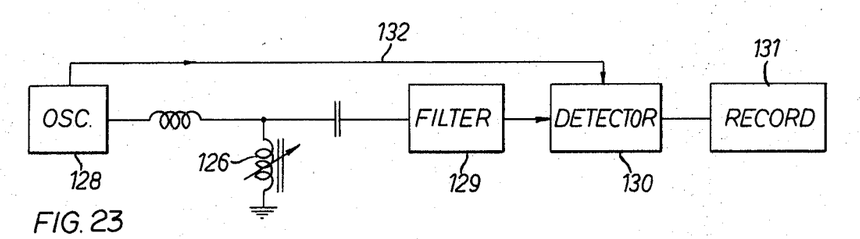
FIG. 23 is an electrical diagram in schematic form of circuitry used with the device of FIGS. 21 and 22.

A circuit as seen in FIG. 23 may be used for producing a recordable signal from the device of FIGS. 21 and 22. An oscillator 128 applies an AC signal of constant level across an inductive impedance divider including the coil 126, so that the coil acts as a variable reactive impedance. The signal across the variable impedance coil 126 is applied by a filter 129 to a detector 130, the output of the detector being applied to a recorder 131. The detector 130 may be an amplitude demodulator, or a phase-sensitive detector may be utilized, in which case a reference signal from the oscillator 128 would be coupled to the detector by a line 132.

Figure 24:
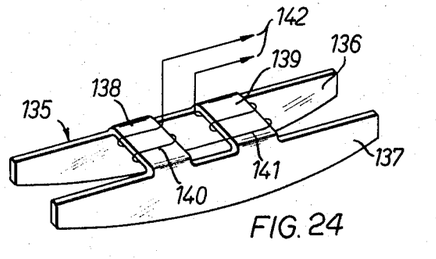
FIG. 24 is a pictorial view of an embodiment of the invention similar to FIG. 21.

Referring to FIG. 24, another embodiment of the flux sensing device of the invention, similar to FIG. 21, is illustrated. A core 135 composed of high permeability material such as Permalloy or Mumetal includes thin, flat pole pieces 136 and 137 shaped in a segment of a circle to conform to the object being inspected. The pole pieces 136 and 137 are joined by two central bridges 138 and 139. Windings 140 and 141 encircle these central parts of the core, the windings being connected in a series-aiding relationship for self-generated flux, but connected in opposition with respect to externally-generated flux passing from one pole piece to the other. The terminals 142 for the windings would be used to connect the device of FIG. 24 into the circuit of FIG. 23 in place of the winding 126. Alternatively, the terminals 142 could connect this device to an impedance bridge for greater sensitivity. Variations in the external magnetic field cause the core 135 to exhibit variations in its permeability, these variations being reflected in the impedance of the coils 140 and 141. The output voltage at the terminals 142 in a bridge or in the circuit of FIG. 23 may be expressed:

$$e_o = f\left(\frac{e_s l}{2\pi f_o n^2 A/\mu}\right)$$

where $f_o$ is the excitation frequency or frequency of the oscillator 128, $n$ is the number of turns on the detector, $A$ is the cross-sectional area of the core, $e_s$ is excitation voltage, $l$ is the effective length of the magnetic circuit in the core, and $\mu$ is related to the external sensed field by the expression:

$$B = \mu H$$

where H is the external field.

In this configuration, the value of $e_o$ is a function of H or external field, while if connected in a bridge circuit the output will be a function of $\Delta H$.

If only a single core is used in place of the dual cores 140 and 141, an additional term in the expression for $e_o$ would be $$e_2 = \frac{\partial \phi}{\partial t}$$

where $\phi$ is a function of H.

By winding two coils on the core, the term for $e_2$ is effectively reduced to zero, and so $\Delta H$ does not appear as a derivative but instead as an absolute value.

Another feature of the arrangement of FIG. 24 is the ability to sense small flux variations in the presence of high ambient magnetic fields. In contrast to flux sensing devices using cores operated in the saturable mode, such as the flux gate magnetometer, in which as the ambient field becomes large the value of $\Delta e_o/e_o$ becomes very small, in this particular device variations in the external field of perhaps 1–10 gauss where the ambient field is on the order of 500–1500 gauss can be sensed and indicated. An additional feature of the embodiment of FIG. 24 is that the electrical power used for driving the device is much less in this variable $\mu$ mode than in the saturating mode, this being of considerable significance in applications where the power supplies are not unlimited in size, as in the pipeline inspection pigs. This configuration measures essentially the total field around or near a discontinuity in a magnetized ferromagnetic body and, as such, is useful in the inspection of ferrous materials where the so-called flux leakage, or flux perturbation technique is required.

In the description of the various embodiments above, the gap between the pole tips on the magnetic structures is referred to as an air gap. It will be understood that the so-called air gap may be filled with any nonmagnetic or high reluctance, low permeability material, even though the term air gap is used.

What is claimed is:
1. A magnetic flux sensor comprising:
   a magnetic core structure of generally closed configuration having a gap therein of nonmagnetic nature,
   at least one flux-responsive device disposed in magnetic flux coupling relationship with said core structure at a position spaced from said gap, the flux-responsive device producing an electrical output related to the magnitude of magnetic flux in at least a portion of said core structure,
   the magnetic core structure adjacent said gap being much wider than the largest dimension of the core structure at the location of the flux-responsive device,
   the magnetic core structure adjacent the gap being much thinner than the corresponding dimension of the core structure at the location of the flux-responsive device,
   whereby the two portions of the magnetic core structure on opposite sides of the gap comprise thin but wide magnetic pole tips, and
   a plurality of nonmagnetic slots extending perpendicularly into each pole tip to form a plurality of segments across the wide dimension of each tip, thereby to collimate magnetic flux coupled into or from the pole tips and to reduce the lengths of eddy current paths in the tips.

2. A flux sensor according to claim 1 wherein the flux-responsive device is a Hall effect element interposed generally transverse to the direction of magnetic flux in the core structure.

3. A flux sensor according to claim 1 wherein the flux-responsive device is a magnetometer of the type having a core of magnetic material along with an input winding and a sense winding.

4. A flux sensor according to claim 1 wherein the magnetic core structure includes a pair of outer pole pieces which comprise said generally closed configuration and a central pole piece with a nonmagnetic gap being provided between each of the outer pole pieces and the central pole piece, said central pole piece being slotted in its tip region adjacent said gaps similarly to the slotted pole tips of the outer pole pieces.

5. Flux sensor according to claim 4 wherein the flux-responsive device is positioned in said central pole piece, with the outer pole pieces defining a continuous loop with no flux-responsive device interposed therein.

6. A flux sensor according to claim 4 wherein a second flux-responsive device is provided and the two flux-responsive devices are respectively interposed between the outer pole pieces and the central pole piece at locations removed from said gaps.

7. A flux sensor according to claim 6 wherein the flux-responsive devices are Hall effect elements interposed generally transverse to the direction of magnetic flux in the core structure.

8. A magnetic flux sensor according to claim 1 wherein the magnetic core tips are curved along said wide dimension to substantially conform to a curved surface of an object being magnetically inspected, whereby said flux sensor may be disposed adjacent the object with the magnetic pole tips being uniformly spaced therefrom throughout their entire widths.

References Cited

UNITED STATES PATENTS

| | | | |
|---|---|---|---|
| 2,803,798 | 8/1957 | McLeod | 324—43 |
| 2,978,545 | 4/1961 | Howling | 324—45 XR |
| 2,999,135 | 9/1961 | Wiegand | 324—43 XR |
| 3,225,293 | 12/1965 | Wood et al. | 324—37 |

FOREIGN PATENTS 943,967    12/1963    Great Britain.

OTHER REFERENCES

B. Kemp, Hall Effect Instrumentation, Sams, Jan. 1963, pp. 108–109.

ALFRED E. SMITH, Primary Examiner

U.S. Cl. X.R.

324—43; 179—100.2